UNITED STATES PATENT OFFICE.

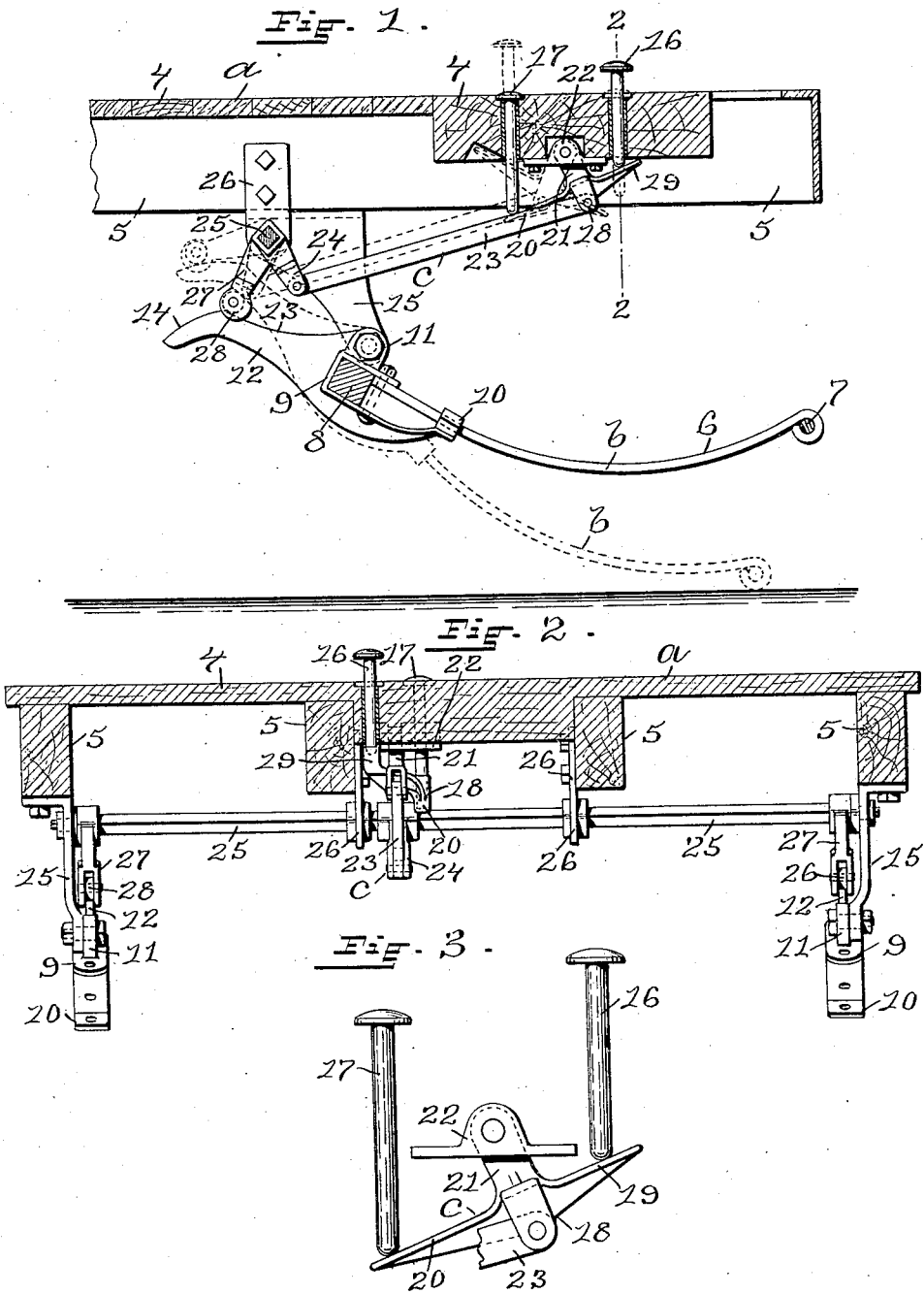

ALBERT J. THORNLEY, OF PAWTUCKET, RHODE ISLAND, ASSIGNOR TO CONSOLIDATED CAR FENDER COMPANY, OF PROVIDENCE, RHODE ISLAND, A CORPORATION OF RHODE ISLAND.

CAR-FENDER.

935,828.   Specification of Letters Patent.   Patented Oct. 5, 1909.

Application filed July 3, 1908. Serial No. 441,879.

*To all whom it may concern:*

Be it known that I, ALBERT J. THORNLEY, a citizen of the United States, residing at Pawtucket, in the county of Providence and State of Rhode Island, have invented a new and useful Improvement in Car-Fenders, of which the following is a specification.

This invention has reference to an improvement in car fenders and more particularly to an improvement in mechanism for lowering and raising the fenders of street cars.

The object of my invention is to improve the construction of a car fender, whereby the fender may be lowered or raised by the motorman without the motorman leaving the car.

A further object of my invention is to construct a car fender so that the fender may be lowered or raised by the operation of the motorman's feet without the motorman leaving his position or moving his hands from the controller and brake levers of the car.

My invention consists in the peculiar and novel construction of a car fender for street cars, said car fender having mechanism for lowering and raising the fender by the feet of the motorman and details of construction, as will be more fully set forth hereinafter and claimed.

Figure 1 is a vertical longitudinal sectional view taken centrally through the platform of a street car provided with my improved car fender and showing the fender in the normal raised position in full lines and in the lowered or dropped position in broken lines. Fig. 2 is a vertical transverse sectional view taken on line 2 2 of Fig. 1 through the platform of the car and showing the body of the fender removed from the lowering and raising mechanism, and Fig. 3 is an enlarged detail side view of the foot operating pins and the adjacent portions of the lowering and raising mechanism.

In the drawings, *a* indicates the platform of a street car, *b* the fender, and *c* the lowering and raising mechanism of the fender.

The platform *a* has the usual floor boards 4 4 supported on the longitudinal beams 5 5, as shown in Figs. 1 and 2.

The fender *b* may be of any adaptable construction. In the preferred form the fender is in the form of a grating formed of a series of curved rods 6 6 secured to a transverse rod 7 at the front and to a transverse beam 8 at the back. A pivot member 9 is secured to each end of the beam 8 by bolts or other means and is constructed to have the forwardly-extending end 10, the eye 11, and the rearwardly-extending lever 12 shaped to have the concave upper edge 13 merging into the convex cam end 14. Each pivot member 9 is pivotally secured by a bolt through the eyes 11 11 to the lower end of a bracket 15 which in turn is secured to the underside of the outer longitudinal beams 5 5, as shown in Figs. 1 and 2.

The lowering and raising mechanism *c* consists of two pins 16 and 17 which extend vertically through holes in the platform *a* in a convenient position for the right and left foot of the motorman, an inverted T-shaped member 18 having the oppositely-disposed arms 19 and 20, and the central arm 21 which is pivotally secured at its upper end to a supporting member 22 which in turn is secured to the underside of the platform *a* in a position for the pin 16 to engage with the arm 19 and for the pin 17 to engage with the arm 20, a bar 23 pivotally secured at its forward end to the lower end of the central arm 21 and at its rear end to an arm 24 secured to a rock shaft 25 which in turn is supported at the center in brackets 26 26 secured to the intermediate beams 5 5 and at the ends in the brackets 15 15 on the outside beams, and an arm 27 having a roll 28 in its lower end and secured to each end of the rock shaft 25 in a position for the rolls 28 28 to engage with the upper edge of the levers 12 12 on the fender *b*, as shown in Fig. 1.

In the operation of my improved car fender, the fender *b* is carried normally in the raised position, as shown in full lines in Fig. 1. In an emergency, such as a person or other obstruction on the track, the motorman depresses the pin 16 with his right foot. This depresses the arm 19 of the member 18 and through the arm 21, the bar 23, the arm 24 and the rock shaft 25 moves the arm 27 toward the rear or in a position to bring the roll 28 on the end of the arm onto the cam end 14 of the lever 12, when the forward end of the fender *b* will fall by gravity to the road bed and the lowering and raising mechanism *c* will assume the position as shown in broken lines in Fig. 1, with the pin 17 in the raised position. After the obstruction has been removed, the fender b is raised into its normal carrying position by the motorman depressing the pin 17 with his left foot. This reverses the before-mentioned operation of the lowering and raising mechanism c. The rolls 28 28 on the arms 27 27 now engaging with the cam ends 14 14 on the levers 12 12 depress the levers 12 12 and raise the fender b into its normal position, where it is held by the rolls 28 28 engaging with the concave upper edges 13 13 of the levers 12 12, as shown in Fig. 1. The pin 16 is now in its raised position for the next operation of lowering the fender.

In practice it has been found that car fenders cannot be suspended nearer than eighteen inches from the road bed on account of the vibrations or vertical oscillations of the car. In carrying my invention into practice I have constructed a car fender that, when in use, is carried normally the required distance from the ground, that may be instantly dropped to the ground and then raised into its normal carrying position without the motorman leaving the car and also without the motorman removing his hands from the controller and brake levers of the car.

It is evident that any form of a fender adaptable to the purpose could be used and that the raising and lowering mechanism c could be varied in details of construction, without materially affecting the spirit of my invention.

Having thus described my invention, I claim as new and desire to secure by Letters Patent:—

1. A fender pivotally secured at the rear under the platform of a car, rearwardly-extending levers on the fender, two pins reciprocally supported in the car platform, an inverted T-shaped member pivotally secured to the car platform in a position for the arms of the member to engage with the pins, arms pivotally secured to the car platform in a position to engage with the levers on the fender, and means for operatively connecting the inverted T-shaped member with the arms, whereby the fender may be lowered or raised and held in the raised position by alternately depressing the pins in the platform of the car.

2. The combination with the platform a of a car, of a fender b pivotally secured at the rear to the platform a, rearwardly-extending levers 12 12 on the fender, and a raising and lowering mechanism c comprising essentially two pins 17 and 18 reciprocally supported in the platform a, an inverted T-shaped member 18 having the arms 19, 20 and 21 and pivotally secured by the arm 21 to the platform a in a position for the arm 19 to engage with the pin 16 and for the arms 20 to engage with the pin 17, a bar 23 pivotally secured at its forward end to the arm 21, an arm 24 pivotally secured to the bar 23 and fixed to a rock shaft 25 supported under the platform a, and arms 27 27 having rolls 28 28 secured to the rock shaft 25 in a position to engage with the levers 12 12 on the fender b, whereby the fender b may be lowered or raised and held in the normal elevated position by alternately depressing the pins 16 and 17 by the feet, as described.

3. In combination with the car platform, a fender, a pivot member supported from the car platform and formed with a forwardly extending end connected to said fender, said pivot member being formed with a rearwardly extending part having a concave upper edge and a convex cam end, and means carried on the car to ride on said concave edge and said cam end to operate the fender from raised to lowered position and vice versa.

4. In combination with the car platform, a fender, a pivot member supported from the car platform and formed with a forwardly extending end connected to said fender, said pivot member being formed with a rearwardly extending part having a concave upper edge and a convex cam end, a rock shaft supported from the car, an arm secured to the rock shaft, a second arm connected to the rock shaft and having its free end for engagement with said concave upper edge and said convex cam end of said pivot member, and means connected to said first arm and operable from the car platform whereby said rock shaft may be actuated.

5. In combination with a car platform, a fender, means for pivotally supporting said fender from the car platform, a rock shaft supported from the car platform, a member rigidly secured to the fender and formed with a concave and a convex part, means carried by the rock shaft to engage said part whereby the fender may be raised and lowered, and means operable from the car platform for actuating said rock shaft.

6. In combination with a car platform, a fender, a rearwardly projecting member carried by the fender, means to engage said member whereby the latter may raise and lower the fender, and means to operate said means including an inverted T-shaped pivotally secured member and a pair of pins to engage the ends of said inverted T-shaped member.

7. In combination with the car platform, and a fender pivotally related thereto, a member carried by the fender and formed with a concave and a convex part, and means operable from the car platform to engage said convex and concave parts whereby to raise and lower the fender.

8. In combination with the car platform, and a fender pivotally related thereto, a member rigidly secured to the fender and formed with a pair of engaging faces, and means to engage said faces whereby when one of the faces is engaged the fender is raised and when the other face is engaged the fender is lowered.

9. In combination with a car platform and a fender pivotally supported therefrom, a member rigidly secured to the fender and formed with a pair of irregular faces, and means to engage said faces successively whereby the fender is lowered when one of the faces is engaged and raised when the other face is engaged.

10. In combination with a car platform and a fender pivoted thereto a member carried by the fender and formed with a plurality of engaging faces, and means adapted to ride on each face whereby when said means engages one of said faces the fender is lowered and when the means engages another of said faces the fender is raised.

In testimony whereof I have signed my name to this specification in the presence of two subscribing witnesses.

ALBERT J. THORNLEY.

Witnesses:
ADA E. HAGERTY,
J. A. MILLER.